United States Patent [19]

Auton

[11] 4,252,837
[45] Feb. 24, 1981

[54] BLADE SHIELDS

[75] Inventor: John P. Auton, Huntingdon, England

[73] Assignee: Warner-Lambert Company, Morris Plains, N.J.

[21] Appl. No.: 911,026

[22] Filed: May 31, 1978

Related U.S. Application Data

[63] Continuation of Ser. No. 778,755, Mar. 17, 1977, abandoned.

[30] Foreign Application Priority Data

Mar. 23, 1976 [GB] United Kingdom ............... 11559/76

[51] Int. Cl.³ .............................................. B05D 3/06
[52] U.S. Cl. ................................. 427/39; 30/346.58; 204/192 C; 204/192 N; 427/50; 427/295
[58] Field of Search ..................... 427/38, 39, 295, 50; 30/346.58; 204/192 N, 192 C

[56] References Cited

U.S. PATENT DOCUMENTS 1,846,622  2/1932  Thompson ..................... 30/346.56

FOREIGN PATENT DOCUMENTS 988456  5/1976  Canada .

Primary Examiner—Bernard D. Pianalto
Attorney, Agent, or Firm—Jeremiah J. Duggan; Louis S. Gillow

[57] ABSTRACT

A razor blade having vacuum deposited structural elements guarding its cutting edge. A plurality of ion plated structural elements are deposited over the blade edge and extending down the edge facets a certain distance. The spacing and extension of the elements beyond the edge are controlled during the deposition process in order to provide desirable shaving characteristics. The blade edge and guard are covered with an adherent film of polytetrafluoroethylene.

10 Claims, 3 Drawing Figures

BLADE SHIELDS

This is a continuation of application Ser. No. 778,755 filed Mar. 17, 1977 and now abandoned.

BACKGROUND OF THE INVENTION

This invention relates to improvements to blade shields for shaving. For as long as man has attempted the removal of hair from the body, energies have been directed to ameliorating the effects of the sharpened cutting edge on the skin of the user. Despite all efforts, occasional skin irritation and bloodletting still occur during the shaving process.

This invention relates to particular, but not exclusively so, to the deposition preferably under vacuum conditions, of structural elements on the body of the blade and more particularly to the providing of a guard over the blade edge so as to protect the user from nicking or cutting of the skin.

Hitherto numerous methods have been devised to minimize this aspect of shaving, a large portion directed to improved forms of edge guard. A patent to Dickinson, U.S. Pat. No. 1,035,548, issued Aug. 13, 1912, discloses a straight razor having a long blade on which is spirally wound a wire or thread to form a guard. Another form of guard is disclosed by Ferraro in U.S. Pat. No. 3,263,330 issued Aug. 2, 1966, wherein the razor blade cutting edge is encapsulated in a folded sheet of metal having a row of holes through which the hairs but not the skin pass for cutting.

A more recent development is disclosed in U.S. Pat. No. 3,505,734 issued to Iten on Apr. 14, 1970, for a cutting blade with self-contained guard. In this patent a razor blade with a self-contained guard in the form of a wire is described. The wire or thread of selected diameter is wound about the body of the blade encompassing its ultimate edge. The spacing or pitch between successive turns of the wire is controlled relative to its diameter to provide protection to the skin of the user and diminished probability of cutting or nicking. With the selected critical thread diameter and spacing between successive thread portions at the cutting edge the blade may be drawn across the skin without coming in contact therewith.

While the self-contained guard of Iten has proven relatively successful in insulating the skin from the ultimate cutting edge of the razor blade, it does introduce numerous and severe problems into the manufacturing of razor blades incorporating its principal features. The thread must be of flexible material having precise dimensional conformity. It must also be sufficiently flexible for winding about the body of the blade and yet strong enough to withstand severing as it passes over and comes in contact with the blade edge. Moreover, once the wire is placed on the blade it must be adhesively or otherwise locked into position to prevent interference with shaving and to maintain its advantageous characteristics. With regard to this latter fact, it must be kept in mind that as the wire comes into contact with the ultimate edge of the blade, the edge being 300 to 500 Angstroms in radius, it necessarily seriously damages the blade edge making such contact portion substantially incapable of providing comfortable shaving characteristics. Such winding process also inherently increases blade damage resulting in a less efficient manufacturing operation.

It is an object of the preferred form of the invention to provide an improved method for applying structural elements to a cutting or razor blade. It is another object of the present invention to provide a razor blade product having structural elements thereon. Another object of the present invention is to provide a razor blade having a vacuum deposited guard formed thereon. Yet another object of the present invention is to provide for the placement of a guard over the ultimate edge of a razor blade in a more efficient and economical manner.

SUMMARY OF THE INVENTION

In overcoming the problems of the prior art and in achieving the objects as heretofore set out, the present invention contemplates a razor blade having vacuum deposited structural elements formed thereon. In one embodiment these elements extend beyond the ultimate edge of the blade thereby providing a guard for preventing nicking and cutting of the user's skin.

According to one preferred aspect of the present invention, the razor blade has deposited structural elements extending beyond the ultimate cutting edge of the blade, thereby providing a guard for preventing nicking and cutting of the user's skin.

According to another preferred aspect the present invention provides a method for depositing the necessary structural elements under vacuum conditions. In this method, a blade or blades have the areas, on which a deposit is required, defined by a suitable masking arrangement. The masked blade is placed in a vacuum chamber in such a way that material vaporized in another part of the chamber will be deposited on it, thus building up the guard structure previously described.

An embodiment of the invention will now be described by way of examples with reference to the accompanying drawings.

DESCRIPTION OF THE PREFERRED EMBODIMENT

Figure 1:
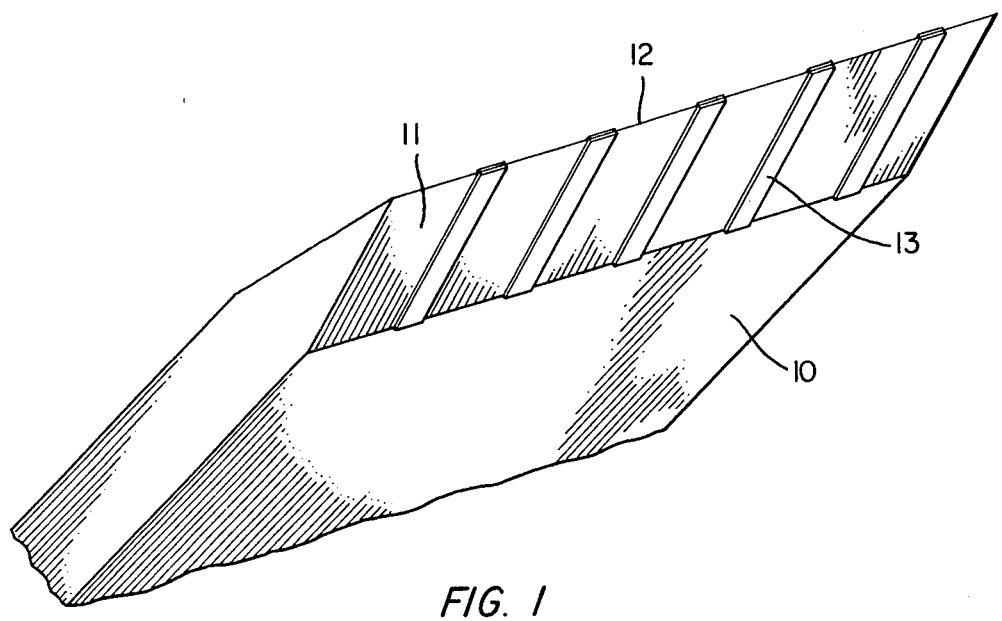
FIG. 1 is a perspective representation of a blade having the necessary structure deposited on it.

Referring to FIG. 1, razor blade 10 is shown having at least two intersecting facets 11 forming an ultimate shaving edge 12. Arranged transversely to the ultimate edge are deposited structural elements 13 passing over edge 12 and extending down the face of facets 11 towards the body of the blade 10. Deposited elements 13 are respectively spaced along and throughout the longitudinal axis of blade 10. Not shown in FIG. 1 is an organic polymer coating placed over the entire edge structure in order to facilitate hair cutting and shaving comfort.

Figure 2:
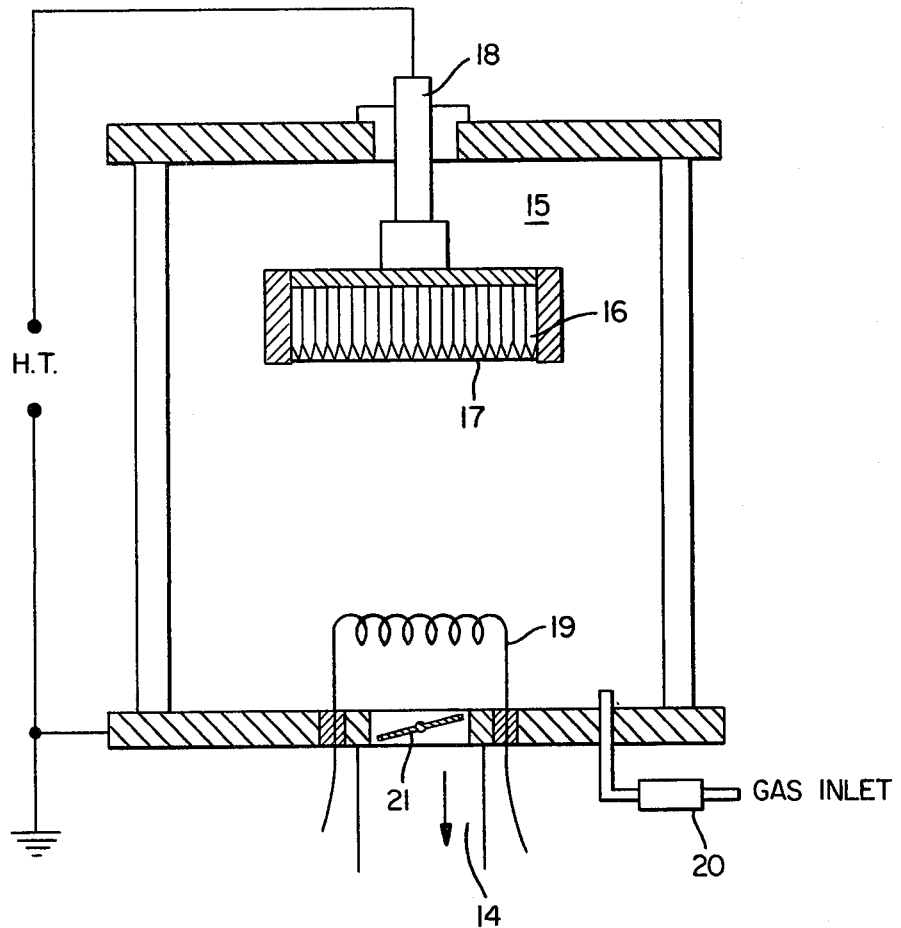
FIG. 2 is a diagrammatic representation of the apparatus needed to carry out the deposition process.

FIG. 2 shows, in schematic form, the equipment necessary to carry out a vacuum deposition. The pumping system 14 typically would consist of a combination of rotary and diffusion pumps but any apparatus capable of evacuation of the chamber 15 to a pressure of $10^{-5}$ Torr, in a time compatible with the total blade production process, could be used. In addition to the pumps, the system would include gauges for monitoring pressure, valves and other components well known to those practiced in the art.

Inside the chamber 15 is held the blade or stack of blades 16 together with their masking arrangement 17. Also in the chamber 15 is a means to vaporize material in such a way that it deposits on the blades 16. A number of methods of achieving this are known and these include thermal deposition, sputtering and ion plating. The equipment described here is that needed for ion plating, but other methods could be used to achieve the structural elements 13.

The essential elements of the ion plating system include a cathode 18, usually water cooled, which can be held at a voltage with respect to the filament 19. The assembly to be coated, in this case the stack of blades 16, is fixed to the cathode 18 in such a way that the blades and mask 17 assume cathode potential and are also cooled via the cathode 18. The material to be deposited is placed on the filament 19 which can be heated by passage of an electric current. Also needed in the system is a controlled leak valve 20 which can be used to let a suitable gas, for the purpose of this description argon, into the vacuum chamber 15.

In a typical ion plating operation, the pressure in the vacuum chamber 15 is reduced to about $10^{-5}$ Torr by using the pumping system 14. The chamber 15 is then backfilled with argon to a pressure of $10^{-2}$ to $5 \times 10^{-2}$ Torr via the leak valve 20. This pressure is maintained by combined use of the leak valve 20 and the baffle valve 21. The bias voltage to the cathode 18, typically 3-5 KV negative with respect to the filament 19 is switched on. This causes a glow discharge and the stack of blades 16 with masking arrangement 17 is bombarded by high energy argon ions from the resulting plasma. The bombardment removes surface material and hence cleans the blades and mask. Typically this cleaning process will last 15 minutes but sometimes rather longer is necessary.

The next stage in the process is the heating of the filament 19 by passage of an electric current. The filament 19 is heated until the material to be deposited, which is on the filament, is vaporized into the discharge. This material which would typically, but not necessarily, be a metal such as gold, aluminum or copper receives energy from collisions with argon ions in the discharge and is finally deposited on the walls of the chamber 15 and on the stack of blades 16. Because of the energy received from the discharge, the material reaches its destination at high velocity and this helps in the formation of a good bond to the surface being coated and also to a good cohesive layer of the coating materials.

The areas of the stack of blades 16 which are built up by the coating are defined by the mask 17 as is later described. The thickness of the coating depends on the geometry of the deposition system, the discharge conditions, the amount of material on the filament 19 and the time during which deposition is carried out. A typical stack of blades 16 could be 10" long and the distance from the stack of blades 16 to the filament 19 could then also be about 10". Under these conditions a typical deposition rate, for metals in a commercially available ion plating system, would be 5 um per minute. The thickness required for the structural elements 13 on the blade is between about 12 um and 100 um and this means a deposition would take between 2 minutes and 20 minutes.

At the end of the deposition, all electrical voltages are switched off, the baffle voltage 21 is closed as is the leak valve 20. The stack of blades 16 can then be removed from the chamber 15, after the pressure has been raised to atmospheric.

In the above description, material was vaporized into the discharge by the resistance heating of a filament 19. This is only one method of vaporization and this disclosure covers the others. Specifically, the use of a high energy electron beam, incident on the material to be deposited, as a means of vaporizing the material is included. Other variants such as the use of crucibles and boats instead of a spiral filament are also included as is the use of an RF heated crucible.

Figure 3:
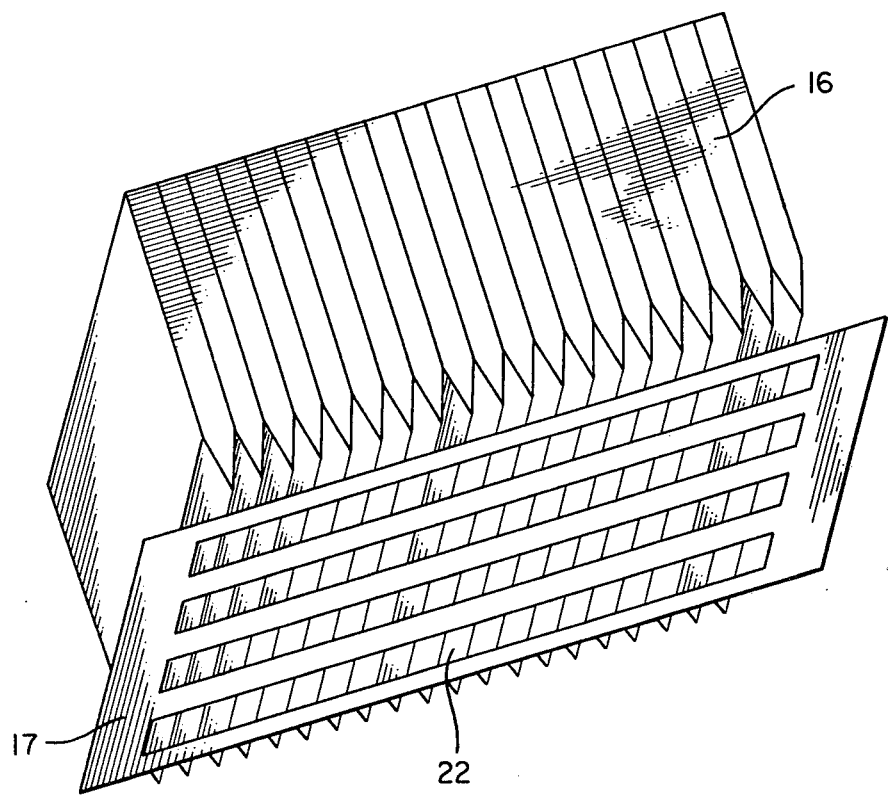
FIG. 3 is a perspective diagrammatic presentation of a stack of blades together with a masking arrangement such as is needed to define the area to be built up by deposition.

FIG. 3 shows diagrammatically a stack of blades 16 together with a masking arrangement 17. In the diagram, the mask 17 is shown as a foil in which slots 22 have been cut by suitable means such as chemical milling. These slots 22 define the area of the blade edge 12 which receives coating material. Their width determines the width of the structural elements 13. These are typically of width 12 um to 100 um and hence the slots 22 in the mask 17 will be in this range. The distance between slots 22 will normally be between 350 um and 750 um.

As an alternative to slots in foil, it is possible to arrange parallel strips or wires so that the gaps between them define the width through which material can pass before deposition on the blade.

In most deposition processes, the material deposited moves in a straight line between source and destination. However, in ion plating, collisions in the plasma change the direction of molecules of evaporant. With the masking arrangement indicated in FIG. 3, only the width of the structural element 13 on the blade edge 12 will be that of the slot 22 in the mask. The width will be greater the further one goes down the face of the facets 11. This effect will be particularly noticeable when the deposition process used is ion plating because of the scattering collisions in the discharge but the tapered profile of the structural elements 13 will not affect the shaving performance of the finished blade. The length to which the structural element 13 extends down the facet 11 is not critical but will normally be in the range 50 um to 150 um. The thickness of the elements 13 will gradually taper off with distance down the facet 11 from the edge 12.

Razor blades with elements 13 deposited by a vacuum process will have a blade shield possessing a high degree of uniformity from blade to blade and may be made in high volume production at a low unit manufacturing cost. It may be said that razor blades with edge shields formed by vacuum deposition provide an opportunity to maximize safety from nicks and cuts without sacrificing closeness of the shave to be achieved and without introducing undue difficulties and inefficiencies into the shaving process.

Thus, the disclosed invention has provided a method for producing a razor blade having inherently safer cutting characteristics without sacrificing the efficiency of the cutting operation itself or the efficiency of the manufacturing process. The novel application of vacuum deposition to the formation of a guard member about the ultimate edge of the razor blade introduces unique advantages in the blade industry and an improved product. Disclosure and drawings contained herein are intended as illustrative of the invention and not delimiting of its scope; therefore, all those modifications and extensions of the invention which are obvious to one of ordinary skill in the art are considered to come within the scope and ambit of the patent application.

What is claimed is:

1. A method for forming a guard over a razor blade edge comprising the steps of:
   placing the blade in a vacuum chamber,
   masking the blade edge in a predetermined pattern,
   establishing a vacuum,
   introducing an inert gas into the chamber after establishing said vacuum,
   applying an electrical potential between an anode and a cathode in the chamber sufficient to create a plasma, and
   interacting said plasma with a material in the chamber so that the material is deposited on the blade edge in accordance with the masking pattern.

2. A razor blade having a guard over the cutting edge, the guard formed in accordance with the method of claim 1.

3. The method of claim 1 wherein sufficient material is interacted with said plasma for sufficient time that said material deposited on the blade edge extends approximately 12 microns to approximately 100 microns beyond the blade edge.

4. The method of claim 1 wherein a negative potential is applied to the blade with respect to the anode in the chamber thereby to create the plasma, and the material is vaporized before entering into interaction with the plasma.

5. The method of claim 4 wherein sufficient material is interacted with said plasma for sufficient time that said material deposited on the blade edge extends approximately 12 microns to approximately 100 microns beyond the blade edge.

6. The method of claim 4 wherein the anode is a filament containing the material which is deposited, the filament being heated by an electrical current applied thereto for vaporizing the material.

7. The method of claim 6 wherein said heating of said filament by said electrical current is caused to occur subsequent to the creation of the plasma thereby cleaning the blade edge by collision with ionized inert gas molecules prior to depositing vaporized material on the blade edge.

8. The method of claim 7 wherein the chamber is first evacuated to a pressure of approximately $10^{-5}$ Torr, argon gas is introduced to a pressure between $10^{-2}$ and $5\times 10^{-2}$ Torr and the negative voltage is adjusted to between approximately $-3$ and $-5$ KV to establish the plasma.

9. The method of claim 8 wherein the masking is accomplished by the use of a foil having slots therein, the slots having a width substantially equal to the desired width of the deposited material.

10. The method of claim 8 wherein the blade is cleaned for a period of approximately 15 minutes prior to the material being vaporized.

* * * * *